(12) United States Patent
Thom et al.

(10) Patent No.: US 8,839,353 B2
(45) Date of Patent: Sep. 16, 2014

(54) ATTACK PROTECTION FOR TRUSTED PLATFORM MODULES

(71) Applicant: Microsoft Corporation, Redmond, WA (US)

(72) Inventors: Stefan Thom, Snohomish, WA (US); Robert Karl Spiger, Seattle, WA (US); David R. Wooten, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/673,881

(22) Filed: Nov. 9, 2012

(65) Prior Publication Data

US 2014/0137178 A1 May 15, 2014

(51) Int. Cl.
*G06F 21/00* (2013.01)

(52) U.S. Cl.
USPC .......... 726/1; 726/2; 726/9; 726/27; 713/185; 713/193

(58) Field of Classification Search
CPC .... H04L 63/20; H04L 63/102; G06F 21/6218
USPC .......... 713/193, 185; 726/2, 9, 27, 1
See application file for complete search history.

(56) References Cited

U.S. PATENT DOCUMENTS

| | | | |
|---|---|---|---|
| 6,131,165 A * | 10/2000 | Lipkin et al. | 726/4 |
| 6,687,823 B1 * | 2/2004 | Al-Salqan et al. | 713/167 |
| 7,194,762 B2 | 3/2007 | Challener et al. | |
| 8,438,418 B2 * | 5/2013 | Ashraff et al. | 714/4.1 |
| 2006/0053304 A1 * | 3/2006 | Fries et al. | 713/189 |
| 2006/0085844 A1 * | 4/2006 | Buer et al. | 726/4 |
| 2006/0225127 A1 * | 10/2006 | Roberts et al. | 726/2 |
| 2007/0014416 A1 | 1/2007 | Rivera et al. | |
| 2007/0050635 A1 * | 3/2007 | Popp | 713/185 |
| 2007/0073416 A1 * | 3/2007 | Grawrock | 700/1 |
| 2007/0130477 A1 * | 6/2007 | Barbian et al. | 713/193 |
| 2007/0199044 A1 * | 8/2007 | Hughes | 726/1 |
| 2007/0208665 A1 * | 9/2007 | Ohara | 705/51 |
| 2008/0034412 A1 * | 2/2008 | Wahl | 726/8 |
| 2008/0046581 A1 * | 2/2008 | Molina et al. | 709/229 |
| 2009/0031408 A1 * | 1/2009 | Thom et al. | 726/9 |
| 2009/0193527 A1 * | 7/2009 | Ashkenazi et al. | 726/34 |
| 2009/0271844 A1 * | 10/2009 | Zhang et al. | 726/2 |
| 2012/0036368 A1 | 2/2012 | Spalka | |

OTHER PUBLICATIONS

"Reset the TPM lockout" Nov. 2010, Microsoft, pp. 1-3 Retrieved from http://technet.microsoft.com/en-us/library/dd851452.aspx.*

(Continued)

*Primary Examiner* — Hadi Armouche
*Assistant Examiner* — Shahriar Zarrineh
(74) *Attorney, Agent, or Firm* — Timothy Churna; Andrew Sanders; Micky Minhas

(57) ABSTRACT

A trusted platform module stores information in a protected object having an associated policy. A program requesting access to the information is allowed to access the information if the policy is satisfied, and is denied access to the information if the policy is not satisfied. The trusted platform module uses one or more monotonic counters associated with the protected object to track attempts to access the information. If a threshold number of unsuccessful requests to access the information are received, then the trusted platform module locks the information to prevent the program from accessing the information for an indefinite amount of time.

20 Claims, 8 Drawing Sheets

(56) References Cited

OTHER PUBLICATIONS

Sarmenta, et al., "Virtual Monotonic Counters and Count-Limited Objects Using a TPM without a Trusted OS", Retrieved at <<http://people.csail.mit.edu/cwo/publications/ccs-stc06-slides.pdf>>, Proceedings of the first ACM workshop on Scalable trusted computing, Nov. 3, 2006, pp. 25.

George, Patrick, "User Authentication With Smart Cards in Trusted Computing Architecture", Retrieved at <<http://citeseerx.ist.psu.edu/viewdoc/summary?doi=10.1.1.59.6034>>, Proceedings of Int. Conf. on Security and Management, Las Ve-gas, Nevada, USA. CSREA Press, Jun. 21, 2004, pp. 7.

"Trusted Platform Module Technology Overview", Retrieved at <<http://technet.microsoft.com/en-us/library/jj131725.aspx>>, Feb. 29, 2012, pp. 3.

"Backing Up BitLocker and TPM Recovery Information to AD DS", Retrieved at <<http://technet.microsoft.com/en-us/library/dd875529%28v=ws.10%029.aspx>>, Retrieved Date: Jul. 25, 2012, pp. 3.

"Trusted Platform Module Library Part 1: Architecture", *Family "2.0"; Level 00 Revision 00.93; Public Review*, Retrieved from <http://www.trustedcomputinggroup.org/files/resource_files/71486ED4-1A4B-B294-D0B7236AFE47790B/TPM%20Rev%202.0%20Part%201%20-%20Architecture%2000.93p%20121009.pdf>,(Oct. 9, 2012), 267 pages.

"Trusted Platform Module Library Part 2: Structures", *Family "2.0"; Level 00 Revision 00.93; Public Review*, Retrieved from: <http://www.trustedcomputinggroup.org/files/resource_files/71497C58-1A4B-B294-D0E3838846031907/TPM%20Rev%202.0%20Part%202%20-%20Structures%2000.93p%20121009.pdf>,(Oct. 9, 2012), 172 pages.

"Trusted Platform Module Library Part 3: Commands", *Family "2.0"; Level 00 Revision 00.93; Public Review*, Retrieved from <http://www.trustedcomputinggroup.org/files/resource_files/714A4784-1A4B-B294-%20Commands%2000.93p%20121009-code.pdf>,(Oct. 9, 2012), 442 pages.

"Trusted Platform Module Library Part 4: Supporting Routines", *Family "2.0"; Level 00 Revision 00.93; Public Review*, Retrieved from <http://www.trustedcomputinggroup.org/files/resource_files/714B0FD1-1A4B-B294-D0BE5F26C4B4FA23/TPM%20Rev%202.0%20Part%204%20-%20Supporting%20Routines%2000.93p%20121009-code.pdf>,(Oct. 9, 2012), 516 pages.

"TPM Main Part 1 Design Principles", *Specification Version 1.2; Revision 116; TCG Published*, Retrieved from <http://www.trustedcomputinggroup.org/files/static_page_files/72C26AB5-1A4B-B294-D002BC0B8C062FF6/TPM%20Main-Part%201%20Design%20Principles_v1.2_rev116_01032011.pdf>,(Mar. 1, 20111), 184 pages.

"TPM Main Part 2 TPM Structures", *Specification version 1.2; Level 2 Revision 116; TCG Published*, Retrieved from <http://www.trustedcomputinggroup.org/files/static_page_files/72C2B624-1A4B-B294-D0E07C5F7F49140D/TPM%20Main-Part%202%20TPM%20Structures_v1.2_rev116_01032011.pdf>,(Mar. 1, 2011), 202 pages.

"TPM Main Part 3 Commands", *Specification Version 1.2; Level 2 Revision 116; TCG Published*, Retrieved from <http://www.trustedcomputinggroup.org/files/static_page_files/72C33D71-1A4B-B294-D02C7DF86630BE7C/TPM%20Main-Part%203%20Commands_v1.2_rev116_01032011.pdf>,(Mar. 1, 2011), 339 pages.

\* cited by examiner

500

| |
|---|
| PolicyNV(MC,9) AND PolicyNV(MC,10) AND PolicyAuthValue(PW) |
| PolicyNV(MC,10) AND PolicyNV(MC,11) AND PolicyAuthValue(PW) |
| PolicyNV(MC,11) AND PolicyNV(MC,12) AND PolicyAuthValue(PW) |
| PolicyNV(MC,12) AND PolicyNV(MC,13) AND PolicyAuthValue(PW) |
| PolicyNV(MC,13) AND PolicyNV(MC,14) AND PolicyAuthValue(PW) |

| | |
|---|---|
| PolicyNV(*nv,n*) AND PolicyNV(*nv,n+1*) AND PolicyAuthValue(*a*) | 302 |
| PolicyNV(*nv,n+1*) AND PolicyNV(*nv,n+2*) AND PolicyAuthValue(*a*) | 304 |
| PolicyNV(*nv,n+2*) AND PolicyNV(*nv,n+3*) AND PolicyAuthValue(*a*) | 306 |
| PolicyNV(*nv,n+3*) AND PolicyNV(*nv,n+4*) AND PolicyAuthValue(*a*) | 308 |
| PolicyNV(*nv,n+4*) AND PolicyNV(*nv,n+5*) AND PolicyAuthValue(*a*) | 310 |
| PolicyAuthorize(*co*) | 602 |

Fig. 6

ATTACK PROTECTION FOR TRUSTED PLATFORM MODULES

BACKGROUND

As computers have become increasingly commonplace, increasing amounts of data have been stored on computers. This has many benefits for users, including the ability to store large amounts of data in relatively small spaces. However, some of this data is oftentimes intended to be kept secret or revealed to only certain individuals. This data can be protected in different manners, such as using passwords or personal identification numbers. Although such protection can be helpful, computers can be vulnerable to attacks such as dictionary attacks or brute force attacks where numerous attempts to guess the password or personal identification number are made. These vulnerabilities can lead to users having reduced trust in their computers, which detracts from a positive user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request from a program of a computing device is received by a trusted platform module of the computing device. The request is a request to access information in a protected object, and a determination is made as to whether one or more conditions for the program to access the information are satisfied. The program is allowed access to the information if the one or more conditions are satisfied, and is denied access to the information if the one or more conditions are not satisfied. If the one or more conditions are not satisfied for a threshold number of requests from the program, then the information is locked for an indefinite amount of time to prevent the program from accessing the information.

In accordance with one or more aspects, one or more objects are maintained by a trusted platform module of a computing device. Each of the one or more objects stores information and is associated with a policy identifying one or more conditions to be satisfied by a program in order for the program to access the information. For each of the objects, the trusted platform module maintains one or more monotonic counters associated with the object. The one or more monotonic counters are used to determine whether a threshold number of requests to access the information in the object are made that do not satisfy the one or more conditions in the policy associated with the object. For each of the one or more objects, in response to the threshold number of requests to access the information in the object being made that do not satisfy the one or more conditions, the information is prevented from being accessed by the program for an indefinite amount of time.

BRIEF DESCRIPTION OF THE DRAWINGS

The same numbers are used throughout the drawings to reference like features.

FIGS. 3, 4, 5, 6, and 7 each illustrate example policy entries in accordance with one or more embodiments.

DETAILED DESCRIPTION

Attack protection for trusted platform modules is discussed herein. A trusted platform module stores information in protected objects each having an associated policy. A program requesting access to the information in a protected object is allowed to access the information if the policy associated with the protected object is satisfied, and is denied access to the information if the policy associated with the protected object is not satisfied. The trusted platform module uses one or more monotonic counters associated with each protected object to track attempts to access the information. If a threshold number of unsuccessful requests to access the information (requests for which the policy is not satisfied) in a particular protected object are received, then the trusted platform module locks the information, preventing the program from accessing the information in that particular protected object for an indefinite amount of time.

Figure 1:
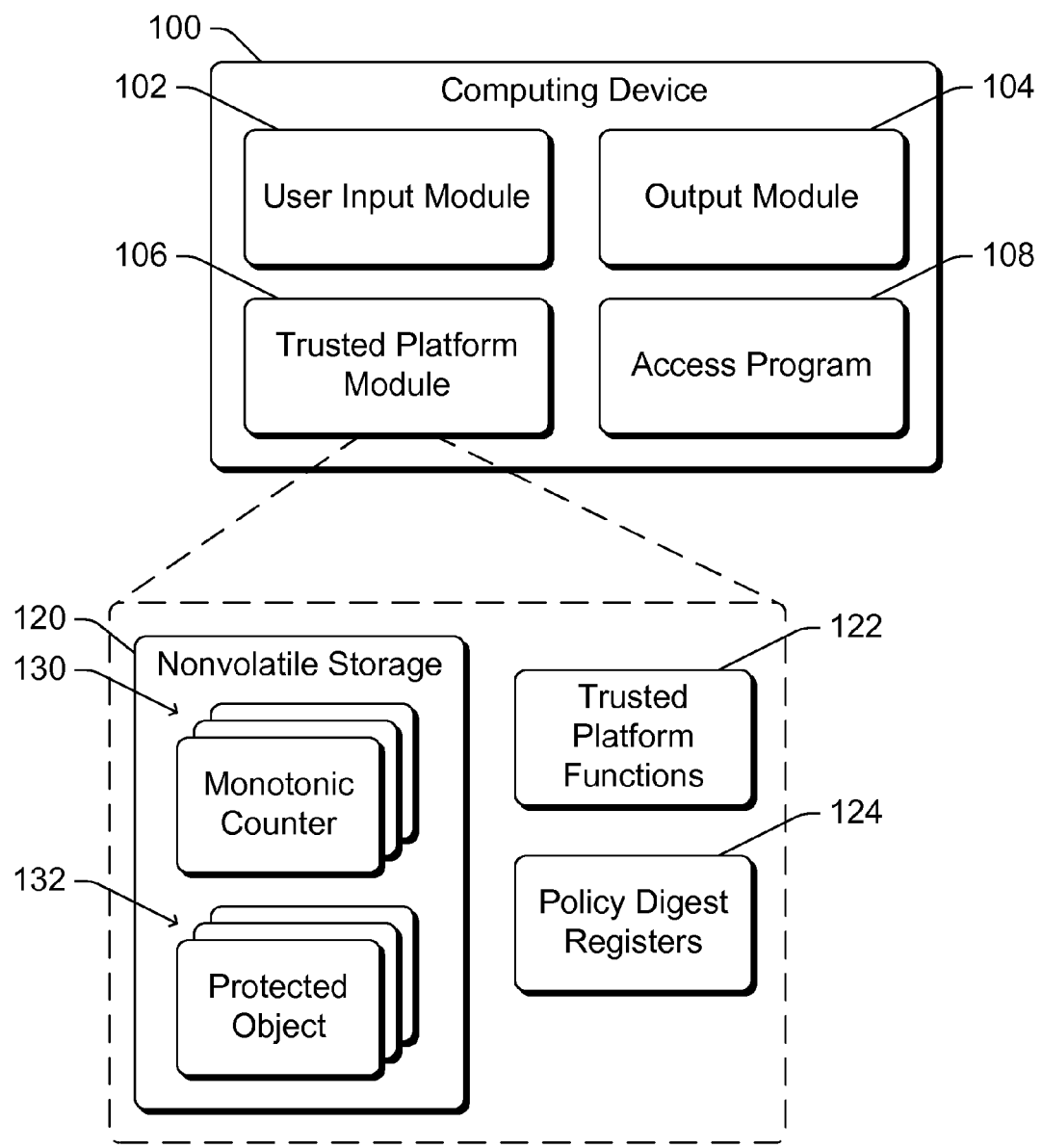
FIG. 1 is a block diagram illustrating an example computing device implementing the attack protection for trusted platform modules in accordance with one or more embodiments.

FIG. 1 is a block diagram illustrating an example computing device 100 implementing the attack protection for trusted platform modules in accordance with one or more embodiments. Computing device 100 can be a variety of different types of devices, such as a physical device or a virtual device. For example, computing device 100 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Computing device 100 can also be a virtual device, such as a virtual machine running on a physical device. A virtual machine can be run on any of a variety of different types of physical devices (e.g., any of the various types listed above). Thus, computing device 100 may range from full resource devices with substantial memory and processor resources (e.g., personal computers, game consoles) to low-resource devices with limited memory and/or processing resources (e.g., traditional set-top boxes, hand-held game consoles).

Computing device 100 includes a user input module 102, an output module 104, and a trusted platform module 106. Although particular functionality is discussed herein with reference to modules 102-106, it should be noted that the functionality of individual ones of modules 102-106 can be separated into multiple modules, and/or at least some functionality of multiple modules 102-106 can be combined into a single module.

User input module 102 receives user inputs from a user of computing device 100. User inputs can be provided in a variety of different manners, such as by pressing one or more keys of a keypad or keyboard of device 100, pressing one or more keys of a controller (e.g., remote control device, mouse, track pad, etc.) of device 100, pressing a particular portion of a touchpad or touchscreen of device 100, making a particular gesture on a touchpad or touchscreen of device 100, and/or making a particular gesture on a controller (e.g., remote control device, mouse, track pad, etc.) of device 100. User inputs can also be provided via other physical feedback input to device 100, such as tapping any portion of device 100, an action that can be recognized by a motion detection or other component of device 100 (such as shaking device 100, rotating device 100, bending or flexing device 100, etc.), and so forth. User inputs can also be provided in other manners, such as via voice or other audible inputs to a microphone, via motions of hands or other body parts observed by an image capture device, and so forth.

Output module 104 generates, manages, and/or outputs content for display, playback, and/or other presentation. This content can be created by output module 104 or obtained from other modules of computing device 100. This content can be, for example, a display or playback portion of a user interface (UI). The content can be displayed or otherwise played back by components of computing device 100 (e.g., speakers, interactive display devices, etc.). Output module 104 can alternatively and/or additionally generate one or more signals that are output to other devices or components (e.g., speakers, display devices, etc.) that are separate from computing device 100.

Trusted platform module 106 provides secure storage and/or secure processing functionality to computing device 100. The secure storage refers to memory, typically nonvolatile memory, that is protected by and can be accessed by only particular functions or other components of trusted platform module 106. The secure processing functionality refers to processors and/or components that operate in a secure manner, shielded from access by or interference from other components or modules of computing device 100 external to trusted platform module 106. In one or more embodiments trusted platform module 106 is a module in accordance with the Trusted Platform Module (TPM) specification (e.g., version 1.3 or version 2.0) available from the Trusted Computing Group of Beaverton, Oreg.

During operation of computing device 100, an access program 108 can request access to information stored by trusted platform module 106. Access program 108 can be implemented in various manners, such as being part of an operating system of computing device 100, being an application separate from the operating system of computing device 100, and so forth. Access program 108 can use the information in a variety of different manners, such as to verify permission to access other functionality of computing device 100 (e.g., log into computing device 100), to access (e.g., decrypt) data on a data storage device of computing device 100, to prove the identity of a user of computing device 100 to a remote device or service, and so forth.

The information for which access is requested by access program 108 is stored in a data structure or object that is referred to as a protected object by module 106 and can take various forms, such as a cryptographic key, as discussed in more detail below. The access to the information can take various forms, such as reading the information, writing or otherwise modifying the information, and so forth. In order to access the requested information, access program 108 provides authentication information to module 106, and module 106 permits access to the requested information only if the authentication information is verified based on a policy associated with the object storing the information. Trusted platform module 106 also implements an attack prevention technique that limits the number of unsuccessful access attempts (requests to access the information with incorrect authentication information), allowing access to the information to be prohibited indefinitely in response to a particular number of incorrect access attempts as discussed in more detail below.

Trusted platform module 106 includes nonvolatile storage 120, one or more trusted platform functions 122, and one or more policy digest registers (PDRs) 124. Trusted platform functions 122 include various functions used in providing secure storage of information, such as authentication functions, key generation functions, encryption and decryption functions, monotonic counter functions, and so forth. Policy digest registers 124 maintain an identifier of a policy session for access program 108. When access program 108 desires to access a protected object, a policy session is created for access program 108. An identifier is associated with the policy session, allowing the policy session to be identified by both trusted platform module 106 and access program 108. The identifier can further be used to encrypt and decrypt communication between module 106 and program 108 if desired. The identifier of the policy session can take various forms, and in one or more embodiments is a digest of the policy that was satisfied by access program 108 based on the authentication information provided to trusted platform module 106.

Nonvolatile storage 120 includes one or more monotonic counters 130 and one or more protected objects 132. Each protected object 132 is a data structure storing information. This information can take various forms, such as one or more cryptographic keys, confidential data, and so forth. Although illustrated as being part of nonvolatile storage 120, one or more protected objects 132 can be stored external to trusted platform module 106. When stored external to module 106, protected objects 132 are stored in a secured manner, such as encrypted using a key known to module 106.

Each monotonic counter 130 is associated with a protected object 132. Typically each counter 130 is associated with a single protected object 132, although alternatively a counter 130 can be associated with multiple objects 132. A single object 132 can be associated with multiple counters 130. Each monotonic counter 130 has the characteristic that the counter can be incremented but not decremented. Each time a monotonic counter 130 is created in trusted platform module 106, the value of the newly created counter is initialized to be the highest value (or the highest value plus some amount) that any monotonic counter in module 106 has had—thus, the newly created counter can have a value no less than any previous or current monotonic counter value in module 106. The monotonic counter 130 allows the number of incorrect attempts to access the information stored in the protected object to be limited before access to the information stored in the protected object is prohibited indefinitely, as discussed in more detail below.

Each protected object 132 has an associated policy that identifies one or more conditions to be satisfied in order for access program 108 to access the information stored in the protected object. These one or more conditions include authentication information to be verified, and also include monotonic counter values.

Figure 2:
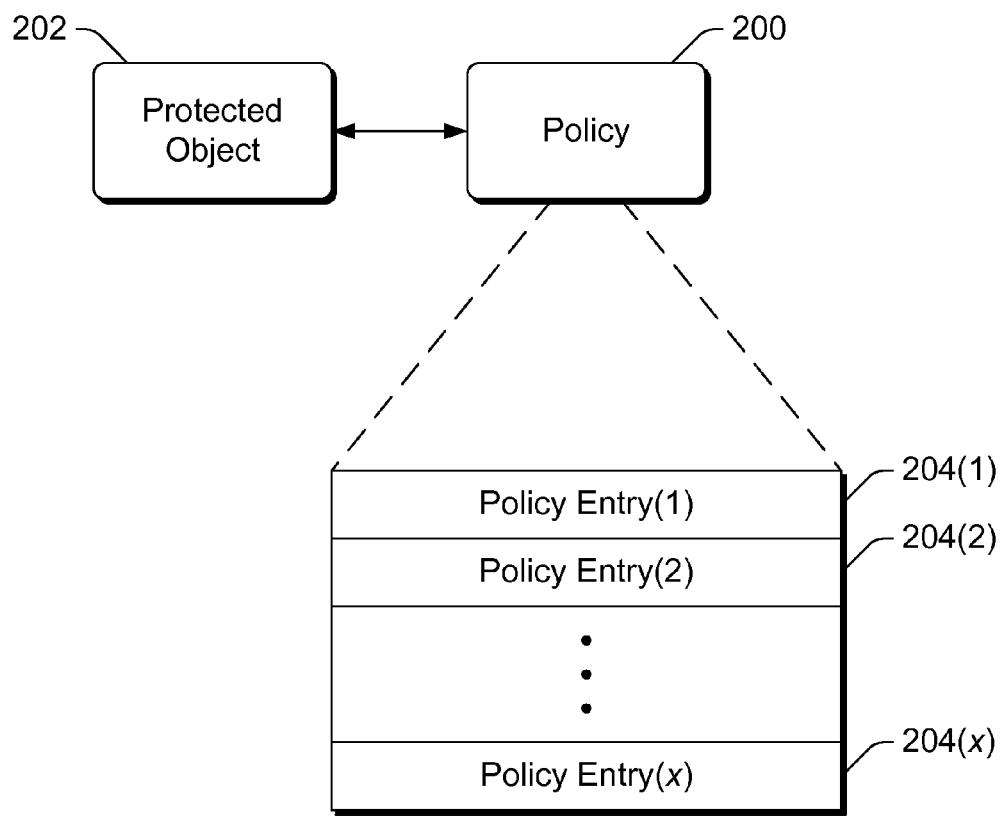
FIG. 2 illustrates an example policy in accordance with one or more embodiments.

FIG. 2 illustrates an example policy in accordance with one or more embodiments. FIG. 2 illustrates a policy 200 associated with a protected object 202 (which can be a protected object 132 of FIG. 1). Policy 200 can be associated with protected object 202 in a variety of different manners. In one or more embodiments, policy 200 is stored in a same data structure as protected object 202 (e.g., the same data structure that stores the information of protected object 202 also stores policy 200). Alternatively, policy 200 can be associated with protected object 202 in other manners, such as by a table or other record associated access object 200 with protected object 202, by storing protected object 202 and policy 200 in particular locations (e.g., of nonvolatile storage 120 of FIG. 1) that associates access object 200 with protected object 202, and so forth.

Policy 200 includes multiple (m) policy entries 204(1), . . . , 204(m). Each policy entry 204 identifies one or more conditions that, if satisfied, allow the access program (e.g., access program 108 of FIG. 1) to access protected object 202. The access program is allowed to access protected object 202 if the conditions of at least one policy entry 204 are satisfied. Thus, the policy 200 can be treated as multiple policy entries that are logically OR'd together.

In one or more embodiments, each policy entry 204 includes two conditions related to a monotonic counter associated with protected object 202 and one condition related to an authorization value associated with protected object 202. The conditions related to the monotonic counter include conditions identifying the value of the monotonic counter, with the two conditions differing in the monotonic counter being incremented (e.g., by a value of 1). Alternatively one or more additional conditions can optionally be included in one or more policy entries 204.

Figure 3:
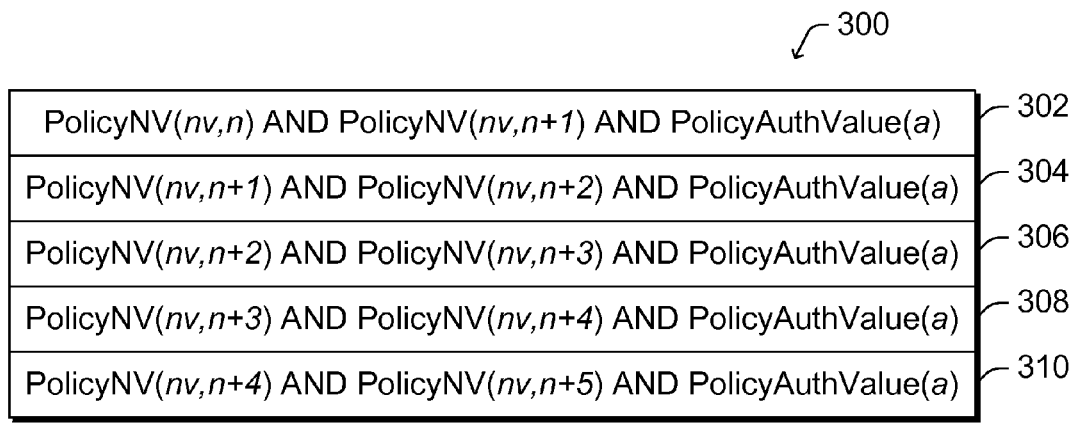

FIG. 3 illustrates example policy entries in accordance with one or more embodiments. FIG. 3 illustrates an example policy 300 with policy entries 302, 304, 306, 308, and 310, each of which can be a policy entry 204 of FIG. 2. Each policy entry 302-310 includes two conditions related to the monotonic counter based on a monotonic counter function referred to as TPM_PolicyNV(x,y). Each such condition is written using the general form PolicyNV(x,y), where x is an argument referring to a monotonic counter and y is an argument referring to a value of the monotonic counter. In order to satisfy such a condition, the specified monotonic counter is to have the specified value. A monotonic counter function TPM_ PolicyNV(x,y) is a function of the trusted platform module (e.g., a trusted platform function 122 of FIG. 1). When invoking the TPM_PolicyNV(x,y) function, values for x and y are provided by the invoking program. The TPM_PolicyNV(x,y) function verifies that the monotonic counter x has the value y, and returns an indication of valid (e.g., success, true, etc.) if the monotonic counter x has the value y, and returns an indication of invalid (e.g., unsuccessful, false, etc.) if the monotonic counter x does not have the value y. Although various discussions herein refer to the TPM_PolicyNV(x,y) function, it should be noted that this is an example function, and that any of a variety of other functions that verify that a particular monotonic counter has a particular value can alternatively be used.

Each policy entry 302-310 includes two conditions based on the monotonic counter function TPM_PolicyNV(x,y). These two conditions in each policy entry 302-310 refer to the same monotonic counter, but have different values for the monotonic counter. The different values for the monotonic counter account for the monotonic counter being incremented (e.g., by 1). For example, policy entry 302 includes conditions PolicyNV(nv,n) and PolicyNV(nv,n+1), indicating that the monotonic counter nv is to have a value of n, and subsequently an incremented value of n+1. By including conditions that account for the monotonic counter being incremented, the policy entries ensure that the monotonic counter associated with the protected object is incremented before access to the information stored in the protected object is permitted.

Each policy entry 302-310 also includes a condition related to a policy authentication value function referred to as TPM_PolicyAuthValue(a). An authentication value function TPM_PolicyAuthValue(a) is a function of the trusted platform module (e.g., a trusted platform function 122 of FIG. 1). This condition is written using the general form PolicyAuthValue (a), where a is an argument referring to the authentication value that is to be provided in order for access to the information stored in the protected object to be permitted. The authentication value can incorporate any factor or value desired (e.g., by the program or user desiring to have the protected component protected). For example, the authentication value can be a personal identification number (PIN) or password input by a user, a PIN or password provided by another component or module, fingerprint or other descriptive data, and so forth. The authentication value can also include various conditions of the device or program, such as a current time of day, a type or version of operating system running on the computing device on which the access program is running, and so forth.

When invoking the TPM_PolicyAuthValue(a) function, a value for a is provided by the invoking program. The TPM_PolicyAuthValue(a) function verifies that the argument a is included in a condition (e.g., a PolicyAuthValue(a) condition) of a policy entry, and returns an indication of valid (e.g., success, true, etc.) if the argument a is in a condition of a policy entry, and returns an indication of invalid (e.g., unsuccessful, false, etc.) if the argument a is not in a condition of a policy entry. Although various discussions herein refer to the TPM_PolicyAuthValue(a) function, it should be noted that this is an example function, and that any of a variety of other functions that verify that a particular authentication value is included in a policy entry can alternatively be used.

The conditions within each policy entry (the two conditions related to the monotonic counter as well as the condition related to the authentication value) are logically AND'd together. Thus, each of the conditions within a policy entry is to be satisfied in order for the policy entry to be satisfied. However, the multiple policy entries are logically OR'd together. Thus, the policy is satisfied if at least one policy entry is satisfied—all policy entries need not be satisfied in order to satisfy the policy.

Policy 300 is illustrated as including five policy entries, although policy 300 can include any number of policy entries. The number of policy entries that include the conditions related to the monotonic counter (e.g., policy entries of the same type as entries 302-310) is equal to the number of failed requests to access the protected object that can be made before the protected object is locked for an indefinite amount of time. Policy 300 can optionally include other types of policy entries that do not include conditions related to the monotonic counter, as discussed in more detail below, and such policy entries do not affect the number of failed requests that result in locking of the protected object. The protected object or information stored in the protected object being locked for an indefinite amount of time refers to access program 108 being denied access to the information stored in the protected object. There is no time limit on the duration of this prevention. If the policy includes other policy entries that do not include conditions related to one or more monotonic counters (e.g., a policy entry dependent on an administrator authorization value as discussed below) then such other policy entries may be used to allow access to the information stored in the protected object. However, the policy entries that include conditions related to one or more monotonic counters cannot be relied on to allow access to the information stored in the protected object.

A policy associated with a protected object can be generated by a module or program of the computing device, such as trusted platform module 106 or access program 108 of FIG. 1. The generation of a policy is also referred as provisioning the protected object for allowing access to the information stored in the protected object. To generate the policy, a particular number of policy entries (analogous to policy entries 302-310) are generated, with the particular number of policy entries being equal to the number of failed requests to access the protected object that can be made before the information stored in the protected object is locked for an indefinite amount of time. The module or program generating the policy provides an identifier of the monotonic counter associated with the protected object (nv in policy entries 302-310), the value of the identified monotonic counter (n in policy entries 302-310), and the authentication value (a in policy entries 302-310). It should be noted that the various values of the monotonic counter in the digest entries, illustrated as n, n+1, n+2, etc. are provided (or generated) without incrementing the monotonic counter. The generated policy is then associated with the protected object, as discussed above.

Figure 4:
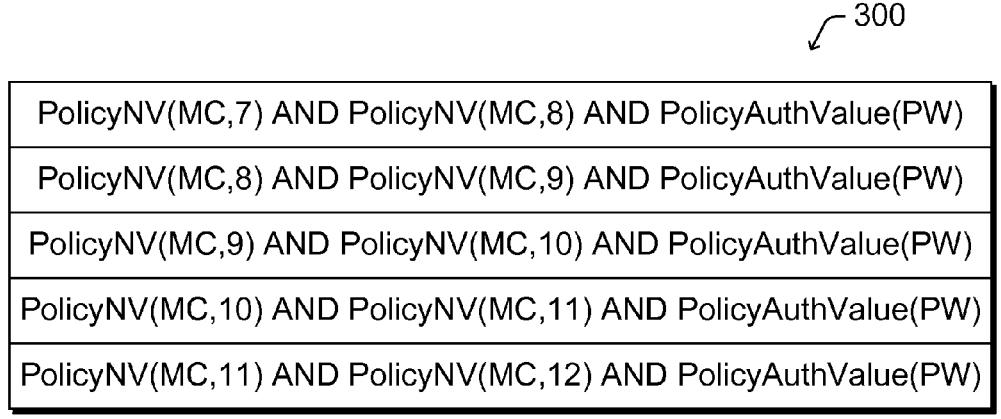

For example, assume that an authentication value that is a password PW is associated with a protected object, that a monotonic counter MC is associated with the protected object, and that the value of monotonic counter MC when the policy 300 was created was 7. Following this example, the policy 300 would include policy entries as illustrated in FIG. 4.

In order to access the information in a protected object, the access program (e.g., access program 108 of FIG. 1) provides both an authentication value and monotonic counter values to the trusted platform module (e.g., module 106 of FIG. 1). The access program obtains the authentication value from various sources, such as from a user (e.g., a user input of a password or PIN), from other components or modules, and so forth. The access program can also obtain the monotonic counter values from various sources, such as having maintained a copy of the monotonic counter value from a previous use of the value, obtaining the value from the trusted platform module (e.g., via a trusted platform function 122 of FIG. 1), and so forth.

The request to access the protected object includes multiple parts and various information is communicated between the access program and the protected object during these parts. In one or more embodiments, the access program begins the request to access the protected object by requesting creation of a policy session. The policy session is created by the trusted platform module, which sets a PDR for the policy session to an initialization value (e.g., zero). The access program also invokes the TPM_PolicyNV(x,y) function, providing as arguments the identifier of the monotonic counter associated with the protected object and the value of that monotonic counter.

The access program then increments the monotonic counter associated with the protected object. The monotonic counter is incremented by invoking a function of the trusted platform module (e.g., a trusted platform function 122 of FIG. 1), such as an TPM_NV_Increment(nv) function, where nv is an argument referring to the monotonic counter nv. In response to this function of the trusted platform module being invoked, the trusted platform module increments the monotonic counter identified by the argument of the function. It should be noted that incrementing of the monotonic counter can be, and typically is, performed outside of the scope of the policy session created for the program to access the protected object.

After incrementing the monotonic counter, the access program again invokes the TPM_PolicyNV(x,y) function, providing as arguments the identifier of the monotonic counter associated with the protected object and the newly incremented value of that monotonic counter. The access program also invokes the TPM_PolicyAuthValue(a) function, providing as an argument the authentication value to access the protected object.

Given the arguments with which the access program twice invoked the TPM_PolicyNV(x,y) function and also invoked the TPM_PolicyAuthValue(a) function, the trusted platform module determines whether at least one of the policy entries is satisfied. Given the nature of the policy entries and the PolicyNV(x,y) conditions, typically only one (if any) policy entry is satisfied. The access program is allowed access to the information in the protected object if at least one of the policy entries in the policy associated with the protected object is satisfied, and is denied access to the information stored in the protected object if none of the policy entries are satisfied.

Following the example of FIG. 4, if the access program were to provide the arguments of MC and 7 when invoking the TPM_PolicyNV(x,y) function the first time, the arguments of MC and 8 when invoking the TPM_PolicyNV(x,y) function the second time, and the argument of PW (the password entered by a user) when invoking the TPM_PolicyAuthValue (a) function, the first policy entry in policy 300 would be satisfied. However, if the user were to inadvertently enter the password WP, then the argument of WP would be provided when invoking the TPM_PolicyAuthValue(a) function and none of the policy entries in policy 300 would be satisfied. If the user were to subsequently enter the correct password of PW, then the access program would next provide the arguments of MC and 8 when invoking the TPM_PolicyNV(x,y) function the first time, the arguments of MC and 9 when invoking the TPM_PolicyNV(x,y) function the second time, and the argument of PW when invoking the TPM_PolicyAuthValue(a) function, resulting in the second policy entry in policy 300 being satisfied.

Thus, as part of the process of requesting access to the information stored in the protected object, the monotonic counter associated with the protected object is incremented. If more requests to access the protected object are made than there are policy entries in the policy associated with the protected object, the monotonic counter will have been incremented beyond the lowest monotonic counter included in any condition of the policy. For example, looking at FIG. 4, if the monotonic counter begin at a value of 7 and is incremented five times as a result of five requests to access the protected object, in any subsequent requests the argument for the monotonic counter value will be at least 12 and (after being incremented) 13, which will satisfy none of the policy entries. Thus, if more requests to access the protected object are made than there are policy entries in the policy associated with the protected object, access to the information stored in the protected object is locked for an indefinite amount of time. The trusted platform module does not deny access for just some particular (possibly variable) amount of time; rather, the trusted platform module denies any subsequent access as the monotonic counter value cannot be reduced to less than 12.

Additionally, in response to the access program being allowed access to the information stored in the protected object due to at least one of the policy entries being satisfied, the trusted platform module records in the PDR for the policy session an indication of the policy entry that was satisfied. This indication is, for example, a hash value or digest of the policy entry that was satisfied. The value in the PDR session is used in subsequent communications between the trusted platform and the access application, such as to identify the policy session, to encrypt and decrypt data communicated as part of the policy session, and so forth.

In one or more embodiments, in response to the access program being allowed access to the information stored in the protected object due to at least one of the policy entries being satisfied, a new policy associated with the protected object is created. Creating this new policy is also referred to as re-provisioning the protected object. This new policy can be created by the access program and/or trusted platform module. This new policy is similar to the policy previously created and associated with the protected object, but because the monotonic counter has been increased differs in the values of the monotonic counters identified in the policy. The value of n in the new policy is the value of the incremented monotonic counter when one of the policy entries was satisfied. The new policy is then associated with the protected object, as discussed above.

For example, following the example of FIG. 4, assume that when requesting access to the information stored in the protected object the password first entered by a user was incorrect, and then in the second attempt the password was entered correctly. The monotonic counter would have been incremented to 9, so the value of n in the new policy is 9. A new policy 500 would then include policy entries as illustrated in FIG. 5.

It should be noted that, in situations in which the policy is included as part of the same data structure as the protected object, a new protected object may be created that includes the new policy. Thus, even though the information being stored in (protected by) the new protected object is the same as in the information in the previous protected object, a new protected object is created rather than changing the previous protected object to include the new policy.

Alternatively, no new policy need be created in response to the access program being allowed access to the information stored in the protected object due to at least one of the policy entries being satisfied. By not creating a new policy, the number of times for which access to the information in the protected object may be allowed is limited to the number of policy entries in the policy. The monotonic counter associated with the protected object is incremented each time a request to access the information in the protected object is made, regardless of whether access to the information was allowed in response to the request. Thus, the information in the protected object can be accessed no more than a number of times equal to the number of policy entries in the policy.

When determining whether at least one policy entry is satisfied, the trusted platform module can make the determination at various points during the request process. In one or more embodiments, as soon as a TPM_PolicyNV(x,y) function or TPM_PolicyAuthValue(a) function is invoked that can be satisfied by none of the policy entries, an indication that access to the information stored in the protected object is denied can be returned to the access program. Alternatively, the trusted platform module can return an indication that access to the information stored in the protected object is denied at other times, such as after the arguments provided with both invocations of the PolicyNV(x,y) function and the argument provided with invocation of the TPM_PolicyAuthValue(a) function are evaluated.

Returning to FIG. 2, in one or more embodiments policy 200 includes a policy entry 204 supporting administrator authorization. Such a policy entry 204 is dependent on an administrator authorization value, but does not include a condition related to the monotonic counter associated with the protected object.

FIG. 6 illustrates example policy entries including an administrator authorization policy entry in accordance with one or more embodiments. FIG. 6 illustrates an example policy 600 with policy entries 302, 304, 306, 308, and 310, analogous to policy 300 of FIG. 3. Policy 600 also includes a policy entry 602 that is based on an administrator authorization policy function referred to as TPM_PolicyAuthorize(co). A policy entry identifying an administrator authorization policy is written using the general form PolicyAuthorize(co), where co is an argument referring to a value indicating how the administrator authorization policy can be verified. The TPM_PolicyAuthorize(co) function is a function of the trusted platform module (e.g., a trusted platform function 122 of FIG. 1). When invoking the TPM_PolicyAuthorize(co) function, one or more values for co are provided by the invoking program. Although various discussions herein refer to the TPM_PolicyAuthorize(co) function, it should be noted that this is an example function, and that any of a variety of other functions that verify administrator authorization policy can alternatively be used.

The administrator authorization policy can be verified in any of a variety of different manners. In one or more embodiments, the co argument of the TPM_PolicyAuthorize(co) identifies a password or PIN to be entered by the user, analogous to the authentication value of the TPM_PolicyAuthValue(a) discussed above. Policy entry 602 includes the value of co, and the administrator authorization policy is verified if the value of co is provided as the argument of the TPM_PolicyAuthorize(co) function. Alternatively, the co argument of the TPM_PolicyAuthorize(co) identifies a protected object in the trusted platform module (e.g., a protected object 132 of FIG. 1). If the access program is allowed access to the information stored in the protected objected identified by the co argument (e.g., using the techniques discussed herein, such as the protected object identified by the co argument having an associated policy 200 of FIG. 2), then the administrator authorization policy is verified.

If the administrator authorization policy is verified, then the access program is allowed access to the information in the protected object. The access program can then re-provision the protected object as discussed above, creating a new policy associated with the protected object. The policy entry 602 is logically OR'd with the other policy entries 302-310 of policy 600, so the access program is allowed access to the information in the protected object if the administrator authorization policy regardless of the value of the monotonic counter associated with the protected object.

Returning to FIG. 2, policy 200 can be implemented in other manners in which specific monotonic counter values are not included in policy entries. In one or more embodiments, policy 200 is implemented using a compare and increment counter policy entry that determines whether the access program is allowed access to the information stored in the protected objected based on the difference between two monotonic counters associated with the protected object.

Figure 7:
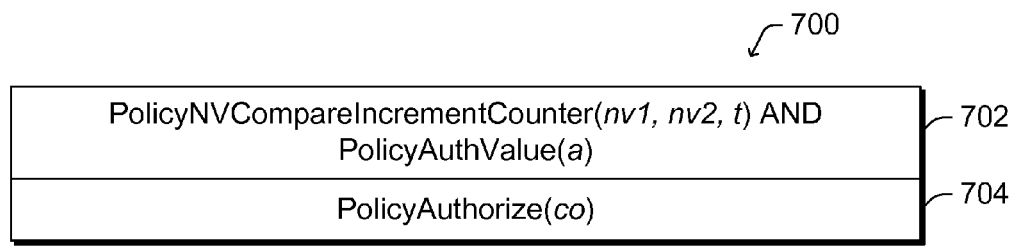

FIG. 7 illustrates example policy entries in accordance with one or more embodiments. FIG. 7 illustrates an example policy 700 with policy entries 702 and 704, each of which can be a policy entry 204 of FIG. 2. Policy entry 702 includes two conditions: one condition related to a compare and increment counter function referred to as TPM_PolicyNVCompareIncrementCounter(nv1, nv2, t), and another condition related to a policy authentication value function referred to as TPM_PolicyAuthValue(a). The compare and increment counter function relies on monotonic counters, and thus is also referred to as being related to a monotonic counter. A compare and increment counter function TPM_PolicyNVCompareIncrementCounter(nv1, nv2, t) is a function of the trusted platform module (e.g., a trusted platform function 122 of FIG. 1). The policy authentication value function is written using the general form PolicyAuthValue(a), where a is an argument referring to the authentication value that is to be provided in order for access to the information stored in the protected object to be permitted as discussed above.

The compare and increment counter function is written using the general form PolicyNVCompareIncrementCounter (nv1, nv2, t), where nv1 and nv2 are arguments referring to two different monotonic counters each associated with the protected object, and t is an argument referring to a threshold difference between the two monotonic counters. One of the two monotonic counters referred to by nv1 and nv2 is an attempt counter that is incremented each time the TPM_PolicyNVCompareIncrementCounter(nv1, nv2, t) is invoked. The other of the two monotonic counters referred to by nv1 and nv2 is a successful attempt counter that is incremented each time the access program is allowed access to the information in the protected object (e.g., each successful request to access the information in the protected object).

When invoking the TPM_PolicyNVCompareIncrementCounter(nv1, nv2, t) function, values for nv1, nv2, and t are is provided by the invoking program. The TPM_PolicyNVCompareIncrementCounter(nv1, nv2, t) function checks whether the values of the two monotonic counters identified by nv1 and nv2 are within the threshold difference t of one another. The function returns an indication of valid (e.g., success, true, etc.) if the two monotonic counters identified by nv1 and nv2 are within the threshold difference t of one another, and returns an indication of invalid (e.g., unsuccessful, false, etc.) if two monotonic counters identified by nv1 and nv2 are not within the threshold difference t of one another. Although various discussions herein refer to the TPM_PolicyNVCompareIncrementCounter(nv1, nv2, t) function, it should be noted that this is an example function, and that any of a variety of other functions that verify that checks whether the values of two monotonic counters are within a threshold difference of one another can alternatively be used.

The conditions within policy entry 702 (the condition related to a compare and increment counter function as well as the condition related to the authentication value) are logically AND'd together. Thus, each of the conditions within policy entry 702 is to be satisfied in order for policy entry 702 to be satisfied and the access program is to be allowed access to the information in the associated protected object.

The TPM_PolicyNVCompareIncrementCounter(nv1, nv2, t) function increments the attempt counter each time the function is invoked regardless of whether the function returns an indication of valid or invalid. The successful attempt counter, however, is incremented only if the TPM_PolicyNVCompareIncrementCounter(nv1, nv2, t) function returns an indication of valid.

The successful attempt counter can be incremented in different manners. In one or more embodiments, the trusted platform module maintains a counter authorization value associated with the successful attempt counter. This counter authorization value can be, for example, the key or other information included in the protected object associated with access policy 700. The access program invokes a function of the trusted platform module (e.g., a trusted platform function 122 of FIG. 1) that increments an identified counter only if the counter authorization value associated with the counter is verified. The access program does not have access to the counter authorization value associated with the counter unless the access program has access to the information stored in the protected object associated with access policy 700. Thus, each time the access program requests and is allowed access to the information stored in the protected object, the successful attempt counter is incremented.

Alternatively, the successful attempt counter can be incremented in other manners. For example, the successful attempt counter can be incremented by the trusted platform module each time the TPM_PolicyNVCompareIncrementCounter (nv1, nv2, t) function returns an indication of valid.

It should be noted that, regardless of the manner in which the successful attempt counter is incremented, the successful attempt counter can be incremented to be equal to the attempt counter. Thus, if one or more (less than the threshold difference t) unsuccessful requests to access the information in the protected object are made, those unsuccessful requests are erased or forgotten when a successful request is made. Alternatively, the successful attempt counter can be incremented by one regardless of the value of the attempt counter. In such situations, the threshold difference t serves as a limit on the number of times that unsuccessful requests to access the information in the protected object can be made. As soon as that number of unsuccessful request have been made, access to the information in the protected object is no longer allowed regardless of how many successful requests to access the information were made.

The request to access the protected object includes multiple parts and various information is communicated between the access program and the protected object during these parts. The access program begins the request to access the protected object by requesting creation of a policy session. The policy session is created by the trusted platform module, which sets a PDR for the policy session to an initialization value (e.g., zero). The access program (e.g., access program 108 of FIG. 1) also invokes the compare and increment counter function of the trusted platform module (e.g., module 106 of FIG. 1), providing identifiers of the attempt counter, the successful attempt counter, and the threshold difference as arguments of the function. Alternatively, the threshold difference argument need not be provided (e.g., the value of the threshold difference identified in policy entry 702 can be obtained by the trusted platform module and used as the threshold difference argument). The access program also obtains the authentication value from various sources as discussed above, and invokes the policy authentication value function, providing the authentication value as an argument of the function. The access program is allowed access to the information stored in the protected object if at least one of the policy entries of policy 700 is satisfied, and is denied access to the information stored in the protected object if none of the policy entries of policy 700 are satisfied.

In response to the access program being allowed access to the information stored in the protected object due to at least one of the policy entries being satisfied, the trusted platform module records in the PDR for the policy session an indication of the policy entry that was satisfied, analogous to the discussion above.

When determining whether at least one policy entry is satisfied, the trusted platform module can make the determination at various points during the request process. In one or more embodiments, as soon as a PolicyNVCompareIncrementCounter(nv1, nv2, t) function or TPM_PolicyAuthValue (a) function is invoked that can be satisfied by none of the policy entries, an indication that access to the information stored in the protected object is denied can be returned to the access program. Alternatively, the trusted platform module can return an indication to the access program that access to the information stored in the protected object is denied at other times, such as after the arguments provided with invocation of the PolicyNVCompareIncrementCounter(nv1, nv2, t) function and the argument provided with invocation of the TPM_PolicyAuthValue(a) function are evaluated.

Policy 700 also optionally includes a policy entry 704 supporting administrator authorization. The policy entry 704 is based on an administrator authorization policy function referred to as TPM_PolicyAuthorize(co), analogous to the discussion above. If the difference between the attempt counter and the successful attempt counter is greater than the threshold difference t, then the PolicyNVCompareIncrementCounter(nv1, nv2, t) condition cannot be satisfied because the value of neither monotonic counter can be decreased. However, if the administrator authorization policy is verified, then the access program is allowed access to the information in the protected object. The access program (or trusted platform module) can then increment the successful attempt counter to be equal to the attempt counter. Subsequent attempts by the access program to access information stored in the protected object thus could result in the PolicyNVCompareIncrementCounter(nv1, nv2, t) condition being satisfied.

It should also be noted that the policy 700 can also be referred to as a static policy because the arguments of the policy need not change each time a request is made to access the information in the protected object associated with policy 700. Policy entry 702 includes arguments that identify monotonic counters associated with the protected object, not the specific values of those monotonic counters (e.g., as in policy 300 of FIG. 3). Thus, the protected object can be provisioned by creation of policy 700, but need not be re-provisioned each time a successful request to access information in the protected object is received.

In one or more embodiments, the trusted platform module (e.g., trusted platform module 106 of FIG. 1) also supports global attack protection. This global attack protection attempts to identify when the trusted platform module is being attacked, such as using a dictionary attack, in an attempt by a malicious or otherwise unauthorized user to access information stored by the trusted platform module. In such situations, the protected objects used with the techniques discussed herein are exempted from this global attack protection.

It can be seen from the discussions herein that the access to information stored in protected objects is on a per-object basis, with different monotonic counters being associated with different protected objects. Thus, if the monotonic counter associated with one protected object were to be incremented (due to requests to access the information in the protected object with incorrect policy authentication values) so that access to that protected objects is locked, access to other protected objects is not locked. For example, assume that multiple protected objects are maintained by the trusted platform module, and that the information in each protected object is a key of a different virtual smartcard (each of which is associated with a different user). If one user were to incorrectly enter his or her password (the policy authentication value) multiple times, then access to the information stored in the protected object with the key for that user to log into the computing device would be locked. However, access to the information stored in other protected objects with keys for other users to log into the computing device would not be locked, so these other users are not prevented from using the computing device simply because one particular user is prevented from using the computing device.

It should also be noted that different protected objects can have different lockout policies indicating how many unsuccessful requests to access the information in the protected objects results in the protected object being locked. These number of unsuccessful requests can be identified in different manners as discussed above (e.g., based on the number of policy entries in the policy associated with the protected object, or based on a threshold difference value in a policy entry). For example, one protected object may allow two unsuccessful requests, another protected object may allow ten unsuccessful requests, and another protected object may allow twenty unsuccessful requests.

Additionally, in the discussions herein reference is made to incrementing the value of a monotonic counter. Typically the monotonic counter is incremented by a value of one, although other amounts can alternatively be used. When using other values, the various conditions in the policy entries are updated appropriately. For example, if the monotonic counter were to be incremented by 2 rather than 1, then policy entry 302 of FIG. 3 would include arguments of n and n+2 for the PolicyNV(x,y) function, policy entry 304 of FIG. 3 would include arguments of n+2 and n+4 for the PolicyNV(x,y) function, and so forth.

Figure 8:
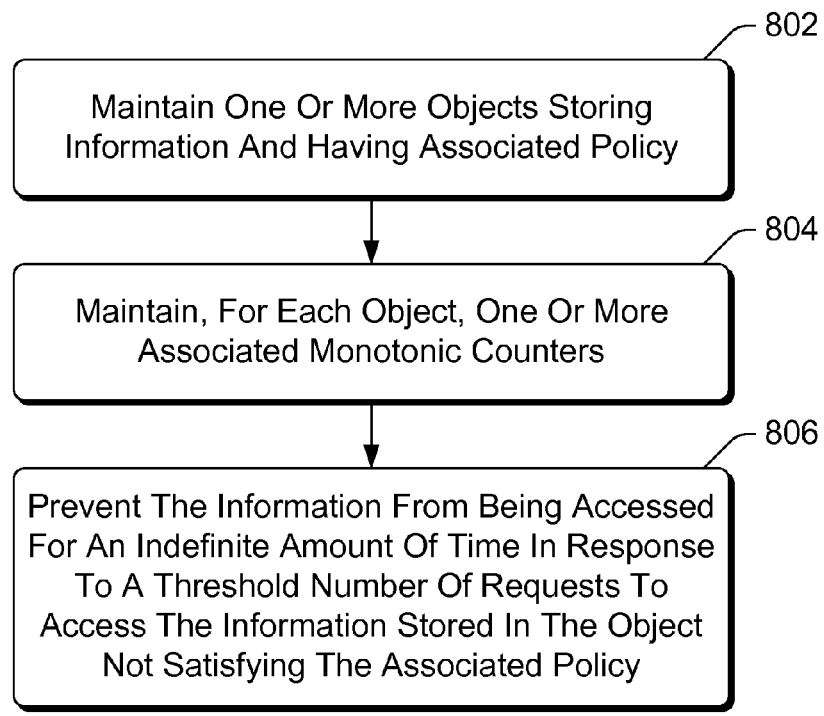
FIG. 8 is a flowchart illustrating an example process for implementing attack protection for trusted platform modules in accordance with one or more embodiments.

FIG. 8 is a flowchart illustrating an example process 800 for implementing attack protection for trusted platform modules in accordance with one or more embodiments. Process 800 is carried out by a trusted platform module, such as trusted platform module 106 of FIG. 1, and can be implemented in software, firmware, hardware, or combinations thereof. Process 800 is shown as a set of acts and is not limited to the order shown for performing the operations of the various acts. Process 800 is an example process for implementing attack protection for trusted platform modules; additional discussions of implementing attack protection for trusted platform modules are included herein with reference to different figures.

In process 800, one or more objects storing information and having associated policy are maintained (act 802). These objects are protected objects maintained by the trusted platform module as discussed above. Various information can be stored by the objects and the policy for an object can be associated with the object in various manners as discussed above.

For each object, one or more monotonic counters associated with the object are maintained (act 804). A single monotonic counter can be associated with the object, or multiple monotonic counters (e.g., an attempt counter and a successful attempt counter) can be associated with the object as discussed above.

The trusted platform module prevents the information in the object from being accessed for an indefinite amount of time in response to a threshold number of requests to access the information not satisfying the associated policy (act 806). This threshold number of requests can be based on the number of policy entries in the associated policy and/or a threshold difference between an attempt counter and a successful attempt counter as discussed above.

Figure 9:
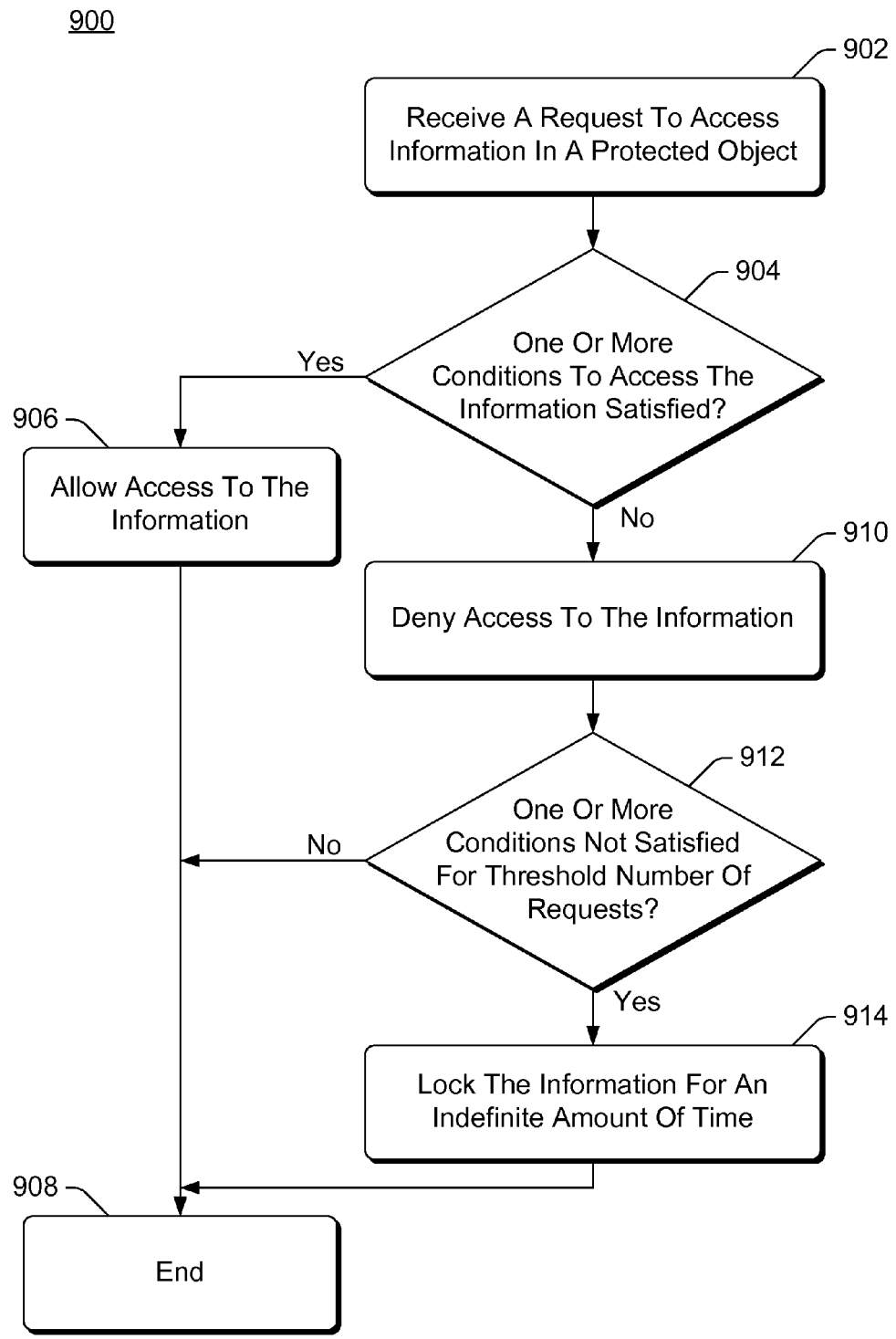
FIG. 9 is a flowchart illustrating another example process for implementing attack protection for trusted platform modules in accordance with one or more embodiments.

FIG. 9 is a flowchart illustrating an example process 900 for implementing attack protection for trusted platform modules in accordance with one or more embodiments. Process 900 is carried out by a trusted platform module, such as trusted platform module 106 of FIG. 1, and can be implemented in software, firmware, hardware, or combinations thereof. Process 900 is shown as a set of acts and is not limited to the order shown for performing the operations of the various acts. Process 900 is an example process for implementing attack protection for trusted platform modules; additional discussions of implementing attack protection for trusted platform modules are included herein with reference to different figures.

In process 900, a request to access information in a protected object is received (act 902). The request can include multiple parts, as discussed above.

A determination is made as to whether one or more conditions for the program to access the information are satisfied (act 904). The one or more conditions are identified in policy entries of a policy associated with the protected object as discussed above. One or more monotonic counters associated with the protected object can also be updated while making this determination as discussed above.

In response to the one or more conditions being satisfied, the program is allowed access to the information (act 906), and process 900 ends. One or more monotonic counters associated with the protected object can also be updated in response to the one or more conditions being satisfied as discussed above.

In response to the one or more conditions not being satisfied, the program is denied access to the information (act 910). A check is also made as whether the one or more conditions have not been satisfied for a threshold number of requests (act 912). This threshold number of requests can be based on the number of policy entries in the associated policy and/or a threshold difference between an attempt counter and a successful attempt counter as discussed above.

In response to threshold number of requests for which the one or more conditions are not satisfied not being met, the process ends (act 908). In response to the one or more conditions having not been satisfied for the threshold number of requests, the information is locked for an indefinite amount of time (act 914). By locking the information, the program is prevented from accessing the information.

The techniques discussed herein support various different usage scenarios. For example, the trusted platform module can be a virtual smartcard that allows (upon entry of the correct PIN for the user) access to functionality of the computing device that includes the trusted platform module (e.g., allows the user to log into the computing device). The virtual smartcard thus operates analogous to a physical smartcard, but is not a separate physical card carried by the user like a physical smartcard. The information stored in one or more protected objects in the trusted platform module can be one or more cryptographic keys of the virtual smartcard. The techniques discussed herein allow access to the computing device to be indefinitely denied in response to a particular number of unsuccessful attempts to access the virtual smartcard (e.g., using the PIN for the virtual smartcard as the authorization value) being made. Thus, if a user's computing device were to be lost or stolen, the user knows that someone else would only have that particular number of guesses at the correct PIN for the virtual smartcard, after which the computing device is effectively locked and not usable.

By way of another example, the information stored in one or more protected objects in the trusted platform module can be one or more cryptographic keys that are used to encrypt and decrypt a data storage device (or one or more other cryptographic keys to encrypt and/or decrypt the data storage device). The data storage device can be part of the computing device that includes the trusted platform module and/or a removable device. The techniques discussed herein allow the ability to decrypt the data storage device to be indefinitely denied in response to a particular number of unsuccessful attempts to access the data storage device (e.g., using a password or PIN for the data storage device) being made. Thus, if a user's data storage device were to be lost or stolen, the user knows that someone else would only have that particular number of guesses at the correct password PIN for the data storage device, after which the data storage device is effectively locked and not usable (cannot be decrypted).

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 10:
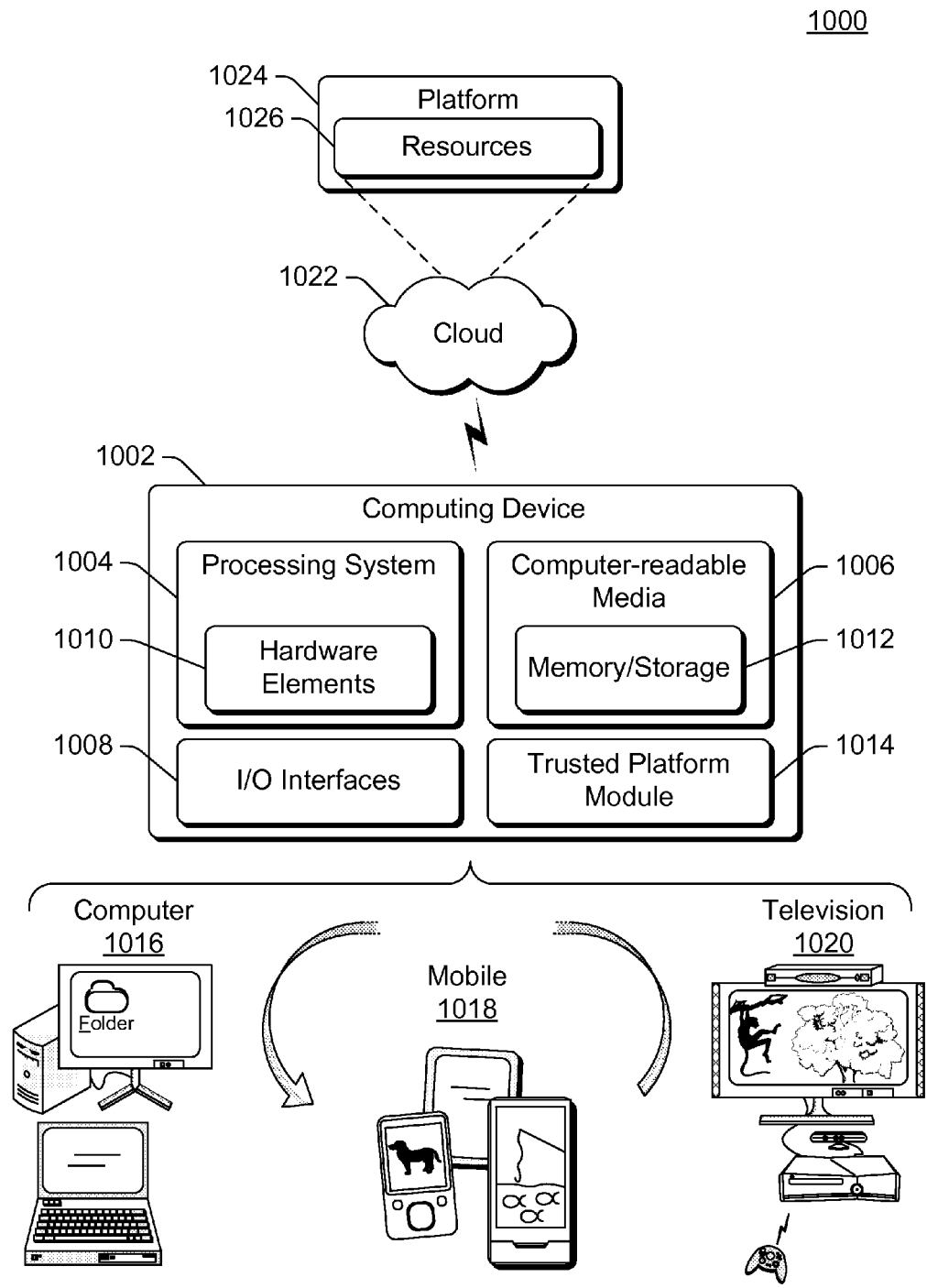
FIG. 10 illustrates an example system that includes an example computing device that is representative of one or more systems and/or devices that may implement the various techniques described herein.

FIG. 10 illustrates an example system generally at 1000 that includes an example computing device 1002 that is representative of one or more systems and/or devices that may implement the various techniques described herein. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O Interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1006 is illustrated as including memory/storage 1012. The memory/storage 1012 represents memory/storage capacity associated with one or more computer-readable media. The memory/storage 1012 may include volatile media (such as random access memory (RAM)) and/or nonvolatile media (such as read only memory (ROM), Flash memory, optical disks, magnetic disks, and so forth). The memory/storage 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Computing device 1002 also includes a trusted platform module 1014. Trusted platform module 1014 provides secure storage and/or secure processing functionality to computing device 1002, as discussed above. Trusted platform module 1014 can be, for example, a trusted platform module 106 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of modules as a module that is executable by the computing device 1002 as software may be achieved at least partially in hardware, e.g., through use of computer-readable storage media and/or hardware elements 1010 of the processing system. The instructions and/or functions may be executable/operable by one or more articles of manufacture (for example, one or more computing devices 1002 and/or processing systems 1004) to implement techniques, modules, and examples described herein.

As further illustrated in FIG. 10, the example system 1000 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1000, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 1002 may assume a variety of different configurations, such as for computer 1016, mobile 1018, and television 1020 uses. Each of these configurations includes devices that may have generally different constructs and capabilities, and thus the computing device 1002 may be configured according to one or more of the different device classes. For instance, the computing device 1002 may be implemented as the computer 1016 class of a device that includes a personal computer, desktop computer, a multi-screen computer, laptop computer, netbook, and so on.

The computing device 1002 may also be implemented as the mobile 1018 class of device that includes mobile devices, such as a mobile phone, portable music player, portable gaming device, a tablet computer, a multi-screen computer, and so on. The computing device 1002 may also be implemented as the television 1020 class of device that includes devices having or connected to generally larger screens in casual viewing environments. These devices include televisions, set-top boxes, gaming consoles, and so on.

The techniques described herein may be supported by these various configurations of the computing device 1002 and are not limited to the specific examples of the techniques described herein. This functionality may also be implemented all or in part through use of a distributed system, such as over a "cloud" 1022 via a platform 1024 as described below.

The cloud 1022 includes and/or is representative of a platform 1024 for resources 1026. The platform 1024 abstracts underlying functionality of hardware (e.g., servers) and software resources of the cloud 1022. The resources 1026 may include applications and/or data that can be utilized while computer processing is executed on servers that are remote from the computing device 1002. Resources 1026 can also include services provided over the Internet and/or through a subscriber network, such as a cellular or Wi-Fi network.

The platform 1024 may abstract resources and functions to connect the computing device 1002 with other computing devices. The platform 1024 may also serve to abstract scaling of resources to provide a corresponding level of scale to encountered demand for the resources 1026 that are implemented via the platform 1024. Accordingly, in an interconnected device embodiment, implementation of functionality described herein may be distributed throughout the system 1000. For example, the functionality may be implemented in part on the computing device 1002 as well as via the platform 1024 that abstracts the functionality of the cloud 1022.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, by a trusted platform module of a computing device, a request from a program of the computing device to access information in a protected object, the request having multiple parts including a first part of the request identifying a first value for a monotonic counter associated with the protected object, a second part of the request identifying a second value for the monotonic counter, the second value having been incremented from the first value, and a third part of the request identifying an authorization value for the information, the protected object including the information and an associated policy, the policy having multiple policy entries including one or more conditions;
   responsive to the trusted platform module receiving the request, determining whether the one or more conditions for the program to access the information are satisfied, the determining including determining the one or more conditions are satisfied only if at least one of the multiple policy entries identifies as conditions the first value for the monotonic counter, the second value for the monotonic counter, and the authorization value for the information;
   allowing the program access to the information in response to the one or more conditions being satisfied;
   creating a new policy associated with the protected object in response to the one or more conditions being satisfied;
   denying the program access to the information in response to the one or more conditions not being satisfied; and
   locking, in response to the one or more conditions not being satisfied for a threshold number of requests from the program, the information for an indefinite amount of time to prevent the program from accessing the information.

2. A method as recited in claim 1, the trusted platform module maintaining multiple protected objects each having a different one or more conditions.

3. A method as recited in claim 2, the threshold number of requests being different for at least two of the multiple protected objects.

4. A method as recited in claim 1, the trusted platform module operating as a virtual smartcard, the information in the protected object comprising a cryptographic key allowing access to additional functionality of the computing device, and the one or more conditions including a personal identification number (PIN) of a user of the computing device.

5. A method as recited in claim 1, the information in the protected object comprising a cryptographic key allowing a data storage device to be decrypted, and the one or more conditions including an authorization value indicating a user of the computing device is permitted to access the data storage device.

6. A method as recited in claim 5, the authorization value comprising a password.

7. A method as recited in claim 1, at least one of the one or more conditions being satisfied in response to an administrator authorization policy being verified.

8. A computing device comprising:
   one or more processors; and
   one or more computer-readable media having stored thereon multiple instructions that, when executed by the one or more processors, cause the one or more processors to perform acts including:
     maintaining, by a trusted platform module of the computing device, one or more objects each storing information and being associated with a policy identifying one or more conditions to be satisfied by a program in order for the program to access the information;
     maintaining, by the trusted platform module, for each of the one or more objects one or more monotonic counters associated with the object and used to determine whether a threshold number of requests to access the information in the object are made that do not satisfy the one or more conditions in the policy associated with the object;
     receiving, by the trusted platform module, a request including multiple parts, a first part of the request identifying an attempt counter and a successful attempt counter, and a second part of the request identifying an authorization value for the information;
     determining, by the trusted platform module, the one or more conditions to be satisfied by the program in order for the program to access the information in one of the one or more objects are satisfied only if the policy associated with the one object identifies the authorization value for the information and a value of the attempt counter is within a threshold difference of a value of the successful attempt counter; and preventing, for each of the one or more objects in response to the threshold number of requests to access the information in the object being made that do not satisfy the one or more conditions in the policy associated with the object, the information in the object from being accessed by the program for an indefinite amount of time.

9. A computing device as recited in claim 8, the one or more objects comprising multiple objects each having a different one or more conditions.

10. A computing device as recited in claim 9, the threshold number of requests being different for at least two of the multiple objects.

11. A computing device as recited in claim 8, the trusted platform module operating as a virtual smartcard, the information in one object of the one or more objects comprising a cryptographic key allowing access to additional functionality of the computing device, and the policy associated with the one object identifying one or more conditions including a personal identification number (PIN) of a user of the computing device.

12. A computing device as recited in claim 8, the information in one object of the one or more objects comprising a cryptographic key allowing a data storage device to be decrypted, and the policy associated with the one object identifying one or more conditions including an authorization value indicating a user of the computing device is permitted to access the data storage device.

13. A computing device as recited in claim 8, at least one of the one or more conditions being satisfied in response to an administrator authorization policy being verified.

14. One or more computer-readable storage media having stored thereon multiple instructions that, when executed by one or more processors of a computing device, cause the one or more processors to:

receive, by a trusted platform module of the computing device, a request from a program of the computing device to access information in a protected object, the trusted platform module maintaining multiple protected objects, each protected object including data and a policy associated with the protected object, the request having multiple parts including a first part of the request identifying a first value for a monotonic counter associated with the protected object, a second part of the request identifying a second value for the monotonic counter, the second value having been incremented from the first value, and a third part of the request identifying an authorization value for the information;

determine, whether one or more conditions of the policy associated with the protected object are satisfied, the policy including multiple policy entries, each policy entry identifying conditions including an authorization value and two different values for the monotonic counter associated with the protected object, each of the multiple protected objects having a different policy and each having a different threshold number of requests;

allow the program access to the information in response to the one or more conditions of the policy being satisfied;

create a new policy associated with the protected object in response to the one or more conditions of the policy being satisfied;

deny the program access to the information in response to the one or more conditions of the policy not being satisfied; and lock, in response to the one or more conditions of the policy associated with the protected object not being satisfied for the threshold number of requests as indicated in the policy associated with the protected object, the information for an indefinite amount of time to prevent the program from accessing the information.

15. One or more computer-readable storage media as recited in claim 14, the trusted platform module operating as a virtual smartcard, the information in the protected object comprising a cryptographic key allowing access to additional functionality of the computing device, and the one or more conditions including a personal identification number (PIN) of a user of the computing device.

16. One or more computer-readable storage media as recited in claim 14, the information in the protected object comprising a cryptographic key allowing a data storage device to be decrypted, and the one or more conditions including an authorization value indicating a user of the computing device is permitted to access the data storage device.

17. One or more computer-readable storage media as recited in claim 14, at least one of the one or more conditions being satisfied in response to an administrator authorization policy being verified.

18. One or more computer-readable storage media as recited in claim 14, the instructions that cause the one or more processors to lock the information for an indefinite amount of time to prevent the program from accessing the information comprising instructions that cause the one or more processors to lock the information to prevent the program from accessing the information for a duration of time with no time limit on the duration of time.

19. A method as recited in claim 1, the locking the information for an indefinite amount of time comprising locking the information to prevent the program from accessing the information for a duration of time in the absence of a time limit on the duration of time.

20. A computing device as recited in claim 8, the preventing the information in the object from being accessed by the program for an indefinite amount of time comprising preventing the information in the object from being accessed by the program for a duration of time in the absence of a time limit on the duration of time.

* * * * *